(12) United States Patent
Kermene et al.

(10) Patent No.: US 10,116,114 B2
(45) Date of Patent: Oct. 30, 2018

(54) METHOD AND SYSTEM FOR GENERATING A HIGH LASER POWER

(71) Applicants: COMPAGNIE INDUSTRIELLE DES LASERS CILAS, Orleans (FR); CENTRE NATIONAL DE LA RECHERCHE SCIENTIFIQUE (CNRS), Paris (FR); UNIVERSITÉ DE LIMOGES, Limoges (FR)

(72) Inventors: Vincent Kermene, Aixe sur Vienne (FR); Agnes Desfarges-Berthelemot, Couzeix (FR); Paul Armand, Limoges (FR); Joel Benoist, Limoges (FR); David Kabeya, Limoges (FR); Alain Barthelemy, Limoges (FR); David Sabourdy, Orleans (FR); Jean-Eucher Montagne, Orleans (FR)

(73) Assignees: COMPAGNIE INDUSTRIELLE DES LASERS CILAS, Orleans (FR); CENTRE NATIONAL DE LA RECHERCHE SCIENTIFIQUE (CNRS), Paris (FR); UNIVERSITE DE LIMOGES, Limoges (FR)

( * ) Notice: Subject to any disclaimer, the term of this patent is extended or adjusted under 35 U.S.C. 154(b) by 0 days.

(21) Appl. No.: 15/520,171

(22) PCT Filed: Oct. 14, 2015

(86) PCT No.: PCT/FR2015/052761
§ 371 (c)(1),
(2) Date: Apr. 19, 2017

(87) PCT Pub. No.: WO2016/062942
PCT Pub. Date: Apr. 28, 2016

(65) Prior Publication Data
US 2017/0324213 A1 Nov. 9, 2017

(30) Foreign Application Priority Data

Oct. 22, 2014 (FR) ..................................... 14 02378

(51) Int. Cl.
*H01S 3/13* (2006.01)
*H01S 3/10* (2006.01)
*H01S 3/23* (2006.01)

(52) U.S. Cl.
CPC ........ *H01S 3/1307* (2013.01); *H01S 3/10053* (2013.01); *H01S 3/1305* (2013.01); *H01S 3/2308* (2013.01)

(58) Field of Classification Search
CPC .. H01S 3/1307; H01S 3/1305; H01S 3/10053; H01S 3/2308
See application file for complete search history.

(56) References Cited

U.S. PATENT DOCUMENTS 9,166,359 B2 * 10/2015 Sabourdy ................. H01S 3/082
2008/0253417 A1 * 10/2008 Livingston ......... B23K 26/0613
372/38.02
2009/0185176 A1 7/2009 Livingston et al.

FOREIGN PATENT DOCUMENTS

WO 2012076785 A1 6/2012

OTHER PUBLICATIONS

Ehlert et al.,"Automated phase sensing and control of an external Talbot cavity laser with phase-contrast imaging", Applied Optics, pp. 5550-5556, vol. 33, No. 24 (Aug. 1994).

(Continued)

*Primary Examiner* — Xinning Niu
(74) *Attorney, Agent, or Firm* — Browdy and Neimark, P.L.L.C.

(57) ABSTRACT

According to the invention, a plurality of elementary laser beams ($f_i$) are generated, the phases of which are adjusted by (Continued)

an electro-optical feedback loop (6, 7*i*, 8*i*, 9) implementing the matrix equation of a phase-contrast filtering device (6).

11 Claims, 2 Drawing Sheets

(56) References Cited

OTHER PUBLICATIONS

Sanders et al.,"Phase Locking of a Two-Dimensional Semiconductor Laser Array in an External Talbot Cavit", Proceedings of SPIE, pp. 72-79, vol. 2148 (Jan. 1994).

\* cited by examiner

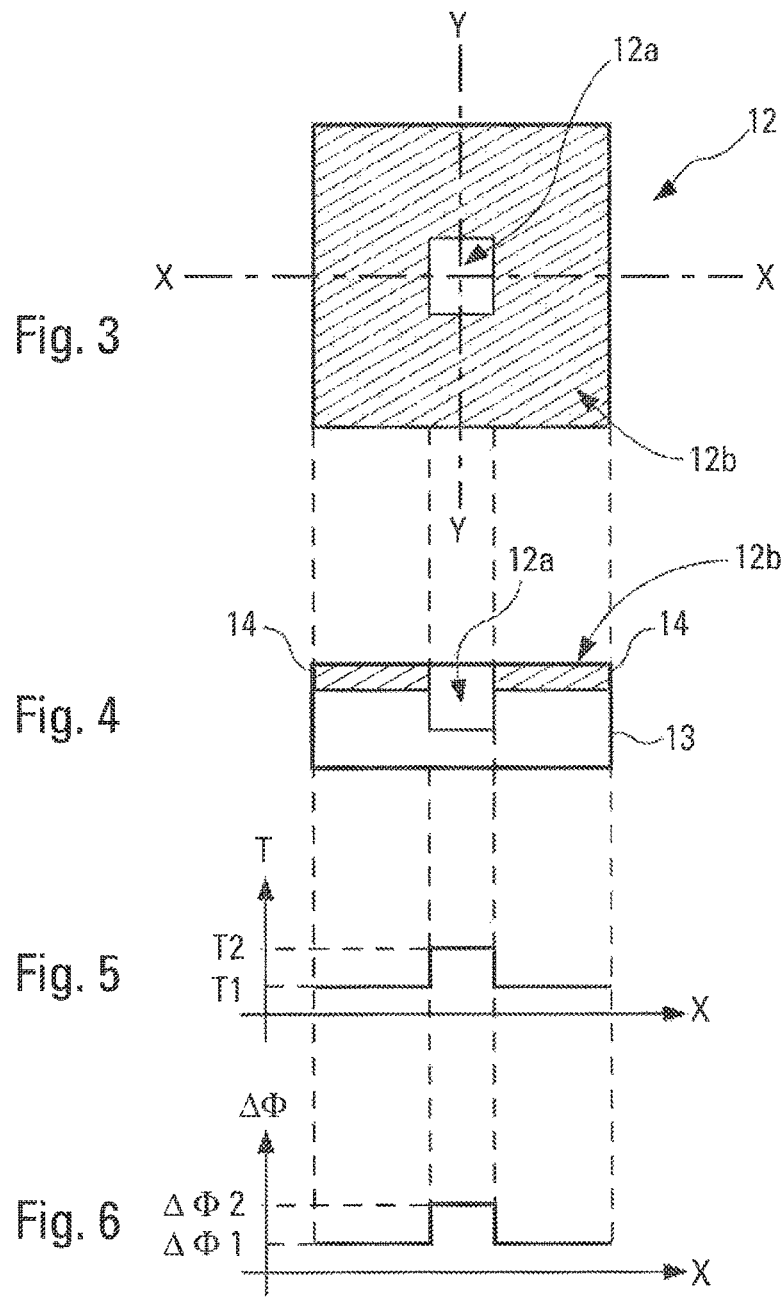

METHOD AND SYSTEM FOR GENERATING A HIGH LASER POWER

The present invention relates to a method and a laser system for generating a high laser power.

It is known that, in order to generate a high laser power, it is possible to generate, initially, a plurality of elementary laser beams and then use them in a block at a distance, or collect together the elementary laser beams thus generated in order to obtain a laser power that is all the greater, the higher the number of elementary beams.

However, so that the resulting laser power can be optimum, it is important for the elementary laser beams to have the same emission frequencies and the same phase. However, in particular because said elementary laser beams cannot follow strictly identical paths, phase differences appear between said elementary laser beams.

To solve this problem of phase differences, the prior document EP 2 649 688 describes a method for generating a high-power laser beam by combining a plurality of elementary laser beams having the same emission frequencies but different phases, this method being distinguished in that:

the relative phase of each of said elementary laser beams is transformed into a light-intensity level by a phase-contrast spatial filtering;

said light-intensity levels corresponding respectively to said elementary laser beams are transformed into phase-correction values; and said phase-correction values are respectively applied to said elementary laser beams.

In this document EP 2 649 688, the phase of each elementary laser beam is adjusted iteratively inside the laser oscillator itself, at each successive passage of said elementary laser beam through said oscillator. Consequently, at the same time as each elementary laser beam converges towards a steady state in which it has its nominal power, all the elementary laser beams converge together towards a global steady state in which they have not only their nominal powers but also phases that are perfectly adjusted with respect to one another so that their subsequent combining is made particularly effective.

The object of the present invention is to allow the implementation of a method for electro-optical adjustment of the elementary laser beam phases, in accordance with an iterative process of conversion of "phase differences—amplitude differences" and then "amplitude differences—phase shifts to be applied to the elementary laser beams", in any type of laser architecture comprising a plurality of elementary laser beams with the same frequencies, and in particular in the known MOPA architecture systems with a master laser beam divided into a plurality of elementary laser beams (see for example U.S. Pat. No. 6,366,356).

To this end, according to the invention, the method for generating a high laser power by means of a plurality of elementary laser beams having the same frequencies but having different phases, a method according to which:

the relative phase of each of said elementary laser beams is transformed into a light-intensity level by a phase-contrast filtering applying a matrix equation M;

the light-intensity level thus obtained for each of said elementary laser beams is transformed into a phase-correction value; and said phase-correction values are respectively applied to the elementary laser beams, is distinguished in that:

a) laser beam portions are taken respectively from said elementary laser beams, said laser beam portions constituting complex optical fields that have respectively the same relative phase as the elementary laser beams from which they originate and wherein the set A that they form is subjected to phase-contrast filtering according to the matrix equation $B = M \cdot A$ in order to form a set B of filtered complex optical fields corresponding to the filtered portions of the laser beam portions;

b) the intensities of the complex fields formed by said laser beam portions are determined before filtering;

c) the intensities of the complex fields formed by said laser beam portions are determined after filtering;

d) the ideal case is considered where all the relative phases of the elementary laser beams are identical and where the complex set A becomes a pure real set $A_{ideal}$ solely formed from the intensities determined at step b) and the corresponding filtered set $B_{ideal}$ is calculated by means of the matrix equation $B_{ideal} = M \cdot A_{ideal}$, in order to determine the corresponding phases of the filtered complex fields in this ideal case;

e) the phases calculated at step d) are attributed to the filtered complex fields in order to form a theoretical filtered set $B_t$, and a theoretical set $A_t$ is calculated before corresponding filtering by the inverse matrix equation $A_t = M^{-1} \cdot B_t$, in order to determine the phases of the complex optical fields constituting this theoretical set $A_t$ before filtering; and f) the sign of said phases of the theoretical set $A_t$ is reversed and these reversed-sign phases are used as phase-correction values.

Thus, by means of the present invention, an electro-optical feedback loop is formed in order to fix target relative phases to a set of laser fields. Such an electro-optical feedback loop allows rapid phase convergence without disturbing the laser emission.

The phase corrections modify the intensities of the filtered beams. Subsequently, steps c), d), e) and f) are reiterated until a desired cophasing level of said elementary laser beams is obtained, or are carried out continuously in order to continuously compensate for any phase defects products by disturbances.

Advantageously, the phase-correction values may be weighted by a multiplying coefficient greater than or equal to 1, in order to optimise the cophasing speed.

The intensities of the complex fields formed by said laser beam portions before filtering may be determined by a prior operation, or continuously.

In particular when said elementary laser beams result from the division of a master laser beam (MOPA architecture), it is advantageous for these elementary laser beams to be amplified before said laser beam portions are taken.

The present invention further relates to a system for generating a high laser power by means of a plurality of elementary laser beams having the same frequencies, but having different phases, this system comprising:

a phase-contrast filtering device transforming, in accordance with a matrix equation M, the relative phases of said elementary beams into light-intensity levels;

means for transforming said light-intensity levels into phase-correction values; and phase modulators for applying said phase-correction values to said elementary laser beams, and being distinguished:

in that it comprises beam-division means for taking laser beam portions from said elementary laser beams;

in that the phase-contrast filtering device is placed on the path of said laser beam portions;

in that it comprises detection means for detecting the intensity of said laser beam portions respectively upstream and downstream of said phase-contrast filtering device; and in that it comprises computing means connected to said detection means, computing the phases of the complex optical fields constituting a theoretical set $A_t$ before filtering and by reversing the sign thereof, and applying the reversed-sign phases as phase-correction values to said phase modulators.

Preferably, said system according to the present invention comprises amplification means for said elementary laser beams, these amplification means being placed between said phase modulators and said beam-division means taking said elementary laser beam portions.

The system according to the present invention may also comprise a laser oscillator generating a master laser beam and a divider generating said elementary laser beams from said master laser beam.

The figures of the accompanying drawing will give a clear understanding as to how the invention can be implemented. In these figures, identical references designate similar elements.

FIGS. 3 and 4 show, respectively in plan view and cross-section, an embodiment of an optical filtering element for the optical system of FIG. 2.

FIGS. 5 and 6 illustrate schematically the action of the filtering element of FIGS. 3 and 4.

Figure 1:
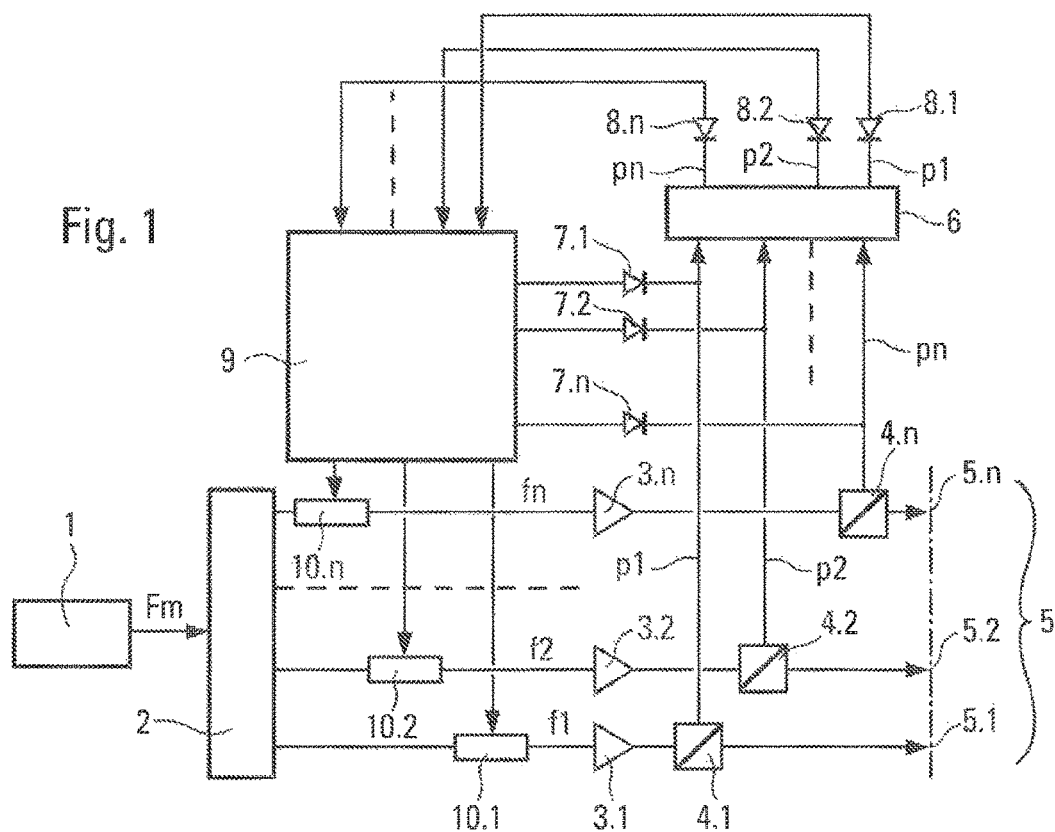
FIG. 1 is the block diagram of an embodiment of a laser system according to the present invention.

The laser system according to the present invention shown schematically in FIG. 1 comprises a laser oscillator 1 emitting a master laser beam $F_m$. The latter is divided by means of a divider 2 into a plurality of n elementary laser beams $f_i$ (with i=1, 2, . . . , n), having the same emission frequencies as the master laser beam $F_m$. However, because in particular of differences in their paths, the elementary laser beams $f_i$ have different phases.

After amplification by respective amplifiers 3.i, the elementary laser beams $f_i$ pass through dividers 4.i without phase shift, which firstly allow most of said elementary beams $f_i$ to pass as far as the respective exits 5.i of said laser system, and secondly take respectively laser beam portions $p_i$ from said elementary laser beams $f_i$.

In accordance with the present invention, the laser system of FIG. 1 comprises an electro-optical loop for feedback cophasing, comprising:

a phase-contrast optical-filtering system 6 receiving the plurality of laser beam portions $p_i$ respectively taken by the dividers 4.i from the elementary laser beams $f_i$ and having phase differences respectively identical to those of the elementary laser beams $f_i$, said filtering system 6 transforming the respective relative phases $\varphi_i$ of the laser beam portions $p_i$ into light intensity levels $\Delta I_i$;

photodiodes 7.i capturing respectively the intensities $a_i$ of said laser beam portions $p_i$ before filtering by the system 6;

photodiodes 8.i capturing respectively the intensities $b_i$ of said laser beam portions $p_i$ after filtering by the filtering system 6;

a computer 9 receiving the intensities $a_i$ and $b_i$ respectively of the photodiodes 7.i and 8.i and computing phase-correction values for the elementary laser beams $f_i$; and phase modulators 10.i, respectively interposed in the path of the elementary laser beams $f_i$, upstream of the amplifiers 3.i, for applying to said elementary laser beams phase-correction values that they receive from the computer 9.

Figure 2:
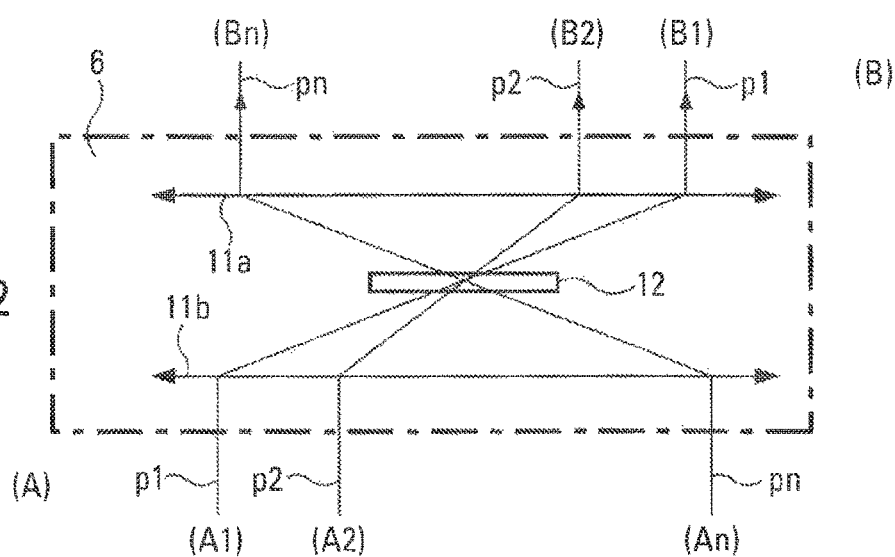
FIG. 2 illustrates schematically an embodiment of a phase-contrast optical system for transforming phases into light-intensity levels.

As depicted in FIG. 2, the phase-contrast optical filtering system 6, which performs the respective transformations of the phases $\varphi_i$ of the elementary laser beams $f_i$ (by means of the portions $p_i$ taken by the separators 4.i), into light-intensity levels, comprises a pair of lenses (or concave mirrors) 11a and 11b arranged so that the image focal plane of the lens 11b coincides with the object focal plane of the lens 11a, in order to form an afocal optical system, as well as an optical filter 12 placed at the focal planes, respectively the image plane of the lens 11b and the object plane of the lens 11a, so that it is aligned on the axis of the afocal optical system thus formed.

The phase-contrast optical-filtering system 6 makes it possible to display the spatial frequency spectrum of the laser beam portions $p_i$ on the optical filter 12, the structure of which is depicted more precisely by FIGS. 3 and 4. This spatial optical filter 12 is derived from phase-contrast imaging techniques, more particularly known in the field of microscopy. This filter 12 has for example two regions, respectively central 12a and peripheral 12b, the optical properties of which differ in terms of phase difference and attenuation, with a view to applying, to each of the n laser beams $p_i$ that passes through it, a differential attenuation according to the phase difference between the mean phase of all the beams $p_i$ and the laser beam $p_i$ in question, in the image focal plane of the lens 11b.

As depicted by FIGS. 3 and 4, the optical filter 12 may comprise:

a lower phase-shift layer 13, the extent of which covers the central 12a and peripheral 12b regions, and which has an additional recess at said central region 12a, and an upper amplitude-attenuation layer 14, the extent of which coincides with the peripheral region 12b.

The lower layer 13, which carries out the required phase shifting, can be formed by a glass plate of high optical quality, etched on its central part. The upper layer 14, which participates in the partial attenuation of the amplitude of each elementary laser beam (solely the peripheral part of said beam) may for its part be formed by a suitable deposition of dielectric layers.

In a variant, the filter 12 may be formed from a single layer, the form and extent of which are similar to those of the lower layer 13, and the optical properties of which are suitable for both attenuating and phase-shifting each elementary beam. For this purpose a suitable dielectric treatment may for example be carried out.

The optical filter 12 thus makes it possible:

as illustrated by FIG. 5 (which shows an example of a profile of the transparency level of the filter 12 along its longitudinal extent), to attenuate the amplitude of the peripheral part (transmittance T1) with respect to that of its central part (transmittance T2 greater than T1) of each elementary laser beam, and as illustrated by FIG. 6 (which shows an example of a profile of the phase-difference level of the filter 12 along its longitudinal extent), to introduce a phase difference between the peripheral part (phase difference $\Delta\Phi 1$) and the central part (phase difference $\Delta\Phi 2$ greater than $\Delta\Phi 1$) of each elementary laser beam.

From the above, it will easily be understood that:

the various portions of the laser beam $p_i$, upstream of the filter 6 (that is to say before filtering), constitute a set A of n complex optical fields $A_i$ having relative phases $\varphi_i$ identical respectively to those of the elementary laser beams $f_i$ and an intensity $a_i$;

the various laser beam portions $p_i$ downstream of the filter 6 (that is to say after filtering) constitute a set B of n complex optical fields $B_i$ having light-intensity levels $b_i$ respectively representing said relative phases $\varphi_i$, and the phase-contrast filtering system 6 establishes a matrix equation between the set A of complex optical fields $A_i$ and the set B of complex optical fields $B_i$, this matrix equation being defined by a complex matrix M, known through construction of said filtering system 6 and integrated in the computer 9, so that the filtered complex fields $B_i$ are deduced from the complex fields $A_i$ by the matrix product B=M.A.

The photodiodes 7.$i$, through prior measurements or continuous measurements, send the square of the moduli of the complex fields $A_i$ to the computer 9, which therefore knows the intensities $a_i$ of the laser beam portions $p_i$ before filtering.

Knowing these intensities $a_i$ and taking into account the fact that the aim sought by the cophasing is that all the phases $\varphi_i$ should be equal, the ideal pure real set $A_{ideal}$, which is then known, is considered. For this ideal set $A_{ideal}$, the computer 9 can then compute the ideal filtered field $B_{ideal}$ by means of the matrix product $B_{ideal}=M.A_{ideal}$ and will deduce therefrom the moduli and the phases $\theta_i$ of the corresponding filtered complex fields.

Moreover, the photodiodes 8.$i$ send the square of the moduli of the complex fields $B_i$ to the computer 9, which therefore knows the intensities $b_i$ of the laser beam portions $p_i$ after filtering.

In accordance with the present invention, the computer 9 allocates the phases $\theta_i$ of the ideal set $B_{ideal}$ to these complex fields $B_i$ of known intensities $b_i$ in order to form a theoretical filtered complex set $B_t$ and computes the complex theoretical set $A_t$ before corresponding filtering by the inverse matrix product $A_t=M^{-1}.B_t$. This computation therefore makes it possible to determine the phases $\varphi'_i$ of the complex optical fields constituting the theoretical set $A_t$.

The computer 9 reverses the sign of the phases $\varphi'_i$ and applies respectively phase-correction values $-\varphi'_i$ to the phase modulators 10.$i$.

With this last step modifying the measurements of the intensities $b_i$ made after filtering, the steps of measuring the moduli $b_i$, of computing $A_t=M^-.B_t$ and of applying the phase-correction values $-\varphi'_i$ are repeated until a desired cophasing level is obtained.

In a variant, these steps may be performed continuously in order to compensate continuously for any phase defects produced by disturbances.

All the exits 5.$i$ of the laser system in FIG. 1, in which there appear respectively the elementary laser beams $f_i$ after cophasing, form a composite laser source 5 with high power and brightness. This composite laser source 5 may be used as it stands, for example in order to illuminate a target that is sufficiently distant for the set of beams $f_i$ to be able to be considered to form a single laser beam.

In a variant, it is possible, in a known fashion, to provide a combination device (not shown) to which the elementary laser beams $f_i$ appearing at the exits 5.$i$ are sent, and which is able to combine said elementary laser beams $f_i$ in order to form a single laser beam with high power and brightness.

In a variant also, it is possible to allocate a weighting coefficient $\gamma$ (a positive real number greater than or equal to 1) to the phase-correction values by applying a correction $\gamma.(-\Phi'_i)$ to the phase modulators 10.$i$ in order to optimise the cophasing speed.

The invention claimed is:

1. Method for generating a high laser power by means of a plurality of elementary laser beams ($f_i$) having the same frequencies but having different phases, a method according to which:

the relative phase ($\varphi_i$) of each of said elementary laser beams ($f_i$) is transformed into a light-intensity level ($\Delta I_i$) by a phase-contrast filtering applying a function matrix equation M;

the light-intensity level ($\Delta I_i$) thus obtained for each of said elementary laser beams ($f_i$) is transformed into a phase-correction value ($-\varphi'_i$); and said phase-correction values ($-\varphi'_i$) are respectively applied to the elementary laser beams ($f_i$), wherein:

a) laser beam portions ($p_i$) are taken respectively from said elementary laser beams ($f_i$), said laser beam portions ($p_i$) constituting complex optical fields ($A_i$) that have respectively the same relative phase ($\varphi_i$) as the elementary laser beams ($f_i$) from which they originate and wherein the set A that they form is subjected to phase-contrast filtering according to the matrix equation B=M.A in order to form a set B of filtered complex optical fields ($B_i$) corresponding to the filtered portions of the laser beam portions ($p_i$);

b) the intensities ($a_i$) of the complex fields ($A_i$) formed by said laser beam portions ($p_i$) are determined before filtering;

c) the intensities ($b_i$) of the complex fields ($B_i$) formed by said laser beam portions ($p_i$) are determined after filtering;

d) the ideal case is considered where all the relative phases ($\varphi_i$) of the elementary laser beams ($f_i$) are identical and where the complex set A becomes a pure real set $A_{ideal}$ solely formed from the intensities ($a_i$) determined at step b) and the corresponding filtered set $B_{ideal}$ is calculated by means of the matrix equation $B_{ideal}=M.A_{ideal}$, in order to determine the corresponding phases ($\theta_i$) of the filtered complex fields in this ideal case;

e) the phases ($\theta_i$) calculated at step d) are attributed to the filtered complex fields ($B_i$) in order to form a theoretical filtered set $B_t$ and a theoretical set $A_t$ is calculated before corresponding filtering by the inverse matrix equation $A_t=M^{-1}.B_t$, in order to determine the phases ($\varphi'_i$) of the complex optical fields constituting this theoretical set $A_t$ before filtering; and f) the sign of said phases ($\varphi'_i$) of the theoretical set $A_t$ is reversed and these reversed-sign phases ($-\varphi'_i$) are used as phase-correction values.

2. Method according to claim 1, wherein steps c), d), e) and are reiterated until a desired level of cophasing of said elementary laser beams ($f_i$) is obtained.

3. Method according to claim 1, wherein steps c), d), e) and are performed continuously in order to compensate continuously for any phase defects produced by disturbances.

4. Method according to claim 1, wherein the intensities ($a_i$) of the complex fields ($A_i$) formed by said laser beam portions ($p_i$) before filtering are determined continuously.

5. Method according to claim 1, wherein the intensities ($a_i$) of the complex fields ($A_i$) formed by said laser beam portions ($p_i$) before filtering are determined during a prior operation.

6. Method according to claim 1, wherein said elementary laser beams ($f_i$) are amplified before said laser beam portions ($p_i$) are taken.

7. Method according to claim 6, wherein said elementary laser beams ($f_i$) result from the division of a master laser beam ($F_m$).

8. Method according to claim 1, wherein the phase-correction values are weighted by a multiplying coefficient greater than or equal to 1.

9. System for generating a high laser power by means of a plurality of elementary beams $f_i$ having the same frequencies, but having different phases, this system comprising:
- a phase-contrast filtering device (6) transforming, in accordance with a matrix equation M, the relative phases ($\varphi i$) of said elementary beams into light-intensity levels ($\Delta I_i$);
- a light-intensity level to phase-correction value transformer (9) for transforming said light-intensity levels ($\Delta I_i$) into phase-correction values ($-\varphi'_i$); and
- phase modulators (10.$i$) for applying said phase-correction values ($-\varphi'_i$) to said elementary laser beams ($f_i$),
- beam dividers (4.$i$) for taking laser beam portions ($p_i$) from said elementary laser beams ($f_i$); in that the phase-contrast filtering device (6) is placed on the path of said laser beam portions ($p_i$);
- detectors (7.$i$ and 8.$i$) for detecting the intensity of said laser beam portions ($p_i$) respectively upstream and downstream of said phase-contrast filtering device (6); and
- a processor (9) connected to said detectors (7.$i$ and 8.$i$), computing the phases ($\varphi'_i$) of the complex optical fields constituting a theoretical set $A_t$ before filtering and by reversing the sign thereof, and applying the reversed-sign phases ($-\varphi'_i$) as phase-correction values to said phase modulators (10.$i$).

10. System according to claim 9, further comprising amplifiers (3.$i$) for amplifying the elementary laser beams ($f_i$) and in that said amplifiers (3.$i$) are placed between said phase modulators (10.$i$) and said beam dividers (4.$i$) taking said laser beam portions ($p_i$).

11. System according to claim 10, further comprising an oscillator (1) generating a master laser beam ($F_m$) and a laser beam divider (2) generating said elementary laser beams ($f_i$) from said master laser beam ($F_m$).

* * * * *